Dec. 13, 1960    H. B. WHITEHURST ET AL    2,963,739
METHOD OF APPLYING METAL TO GLASS
FILAMENTS AND APPARATUS THEREFOR

Filed Nov. 26, 1952    4 Sheets-Sheet 1

HARRY B. WHITEHURST
WILLIAM H. OTTO
INVENTORS

BY
ATTORNEYS

Harry B. Whitehurst
William H. Otto

INVENTORS

BY

ATTORNEYS

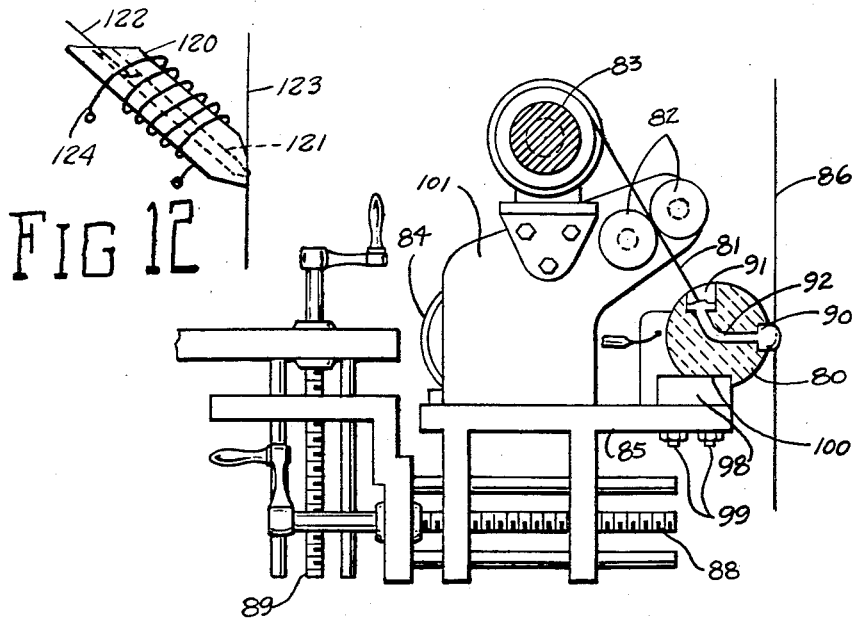
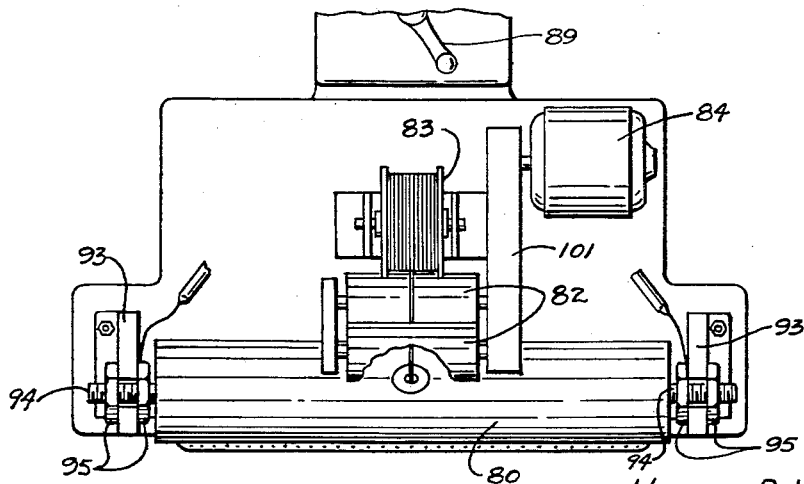

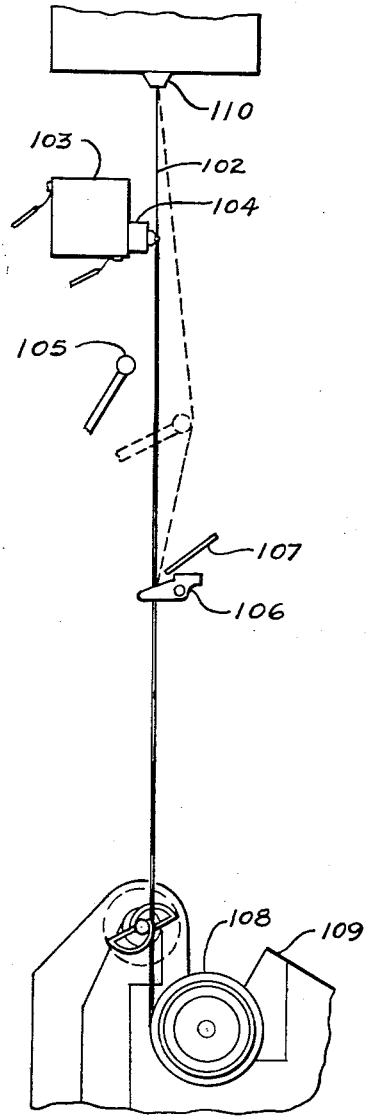
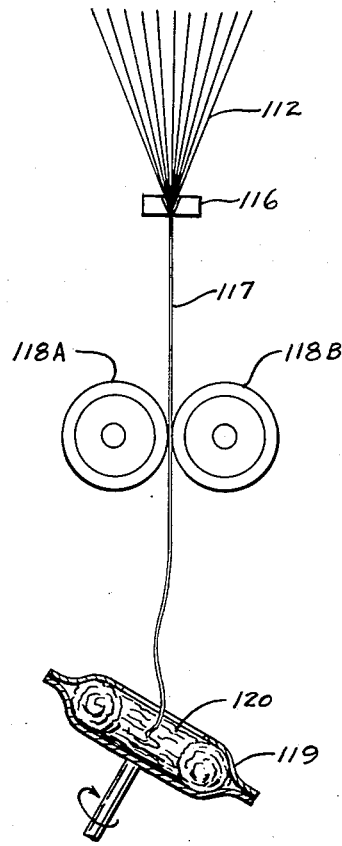
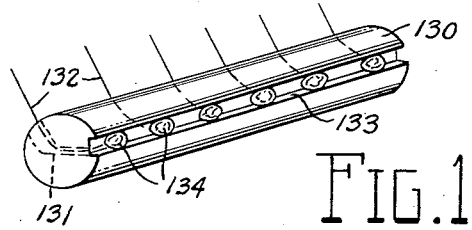
FIG. 10.
FIG. 11.
FIG. 13.
HARRY B. WHITEHURST
WILLIAM H. OTTO
INVENTORS
BY
ATTORNEYS

United States Patent Office 2,963,739
Patented Dec. 13, 1960

2,963,739

METHOD OF APPLYING METAL TO GLASS FILAMENTS AND APPARATUS THEREFOR

Harry B. Whitehurst, Granville, and William H. Otto, Newark, Ohio, assignors to Owens-Corning Fiberglas Corporation, a corporation of Delaware Filed Nov. 26, 1952, Ser. No. 322,598

12 Claims. (Cl. 18—8)

This invention relates to metal coating of filaments or fibers, and more particularly to methods and means for applying metal coatings to continuous glass filaments.

It is well known that glass filaments have extremely high strength characteristics as well as highly desirable flexing characteristics which make them of particular advantage for many uses and applications as reinforcing agents. Such fibers, however, have a weakness to surface abrasion which reduces their overall ability to withstand wear to the extent that it eliminates the possibility of their application for many uses in which the strength and flexibility of the filaments would be highly desirable. The coating of glass filaments with metal such as copper, zinc, aluminum, silver or alloys thereof, it has been found, is highly successful in providing protection against abrasion. Difficulty has been experienced, however, in applying the metal to such filaments at a high rate of speed and with uniformity so as to make it economically feasible to produce them in mass production.

As set out in a copending application of ours, high-speed production of metal-coated glass filaments has been accomplished by passing each of the filaments through an individual bead or globule of molten metal and producing the coating by wetting each filament, resulting in a layer of the metal becoming adheringly associated with the glass. This method of metalling the filaments, however, requires alignment of the filaments in their movement through the globules of metal, to assure continuous envelopment of the filaments for linear and peripheral uniformity of coatings.

In view of the foregoing, it is a principal object of the present invention to provide a new method and means for applying metal to glass filaments which permits economical production of coated filaments at a high rate of speed, and at the same time providing uniformity without the need for great care and attention in aligning filaments adjacent each other in their paths through the metal.

Another object of the invention is to provide a novel method and means for applying metal on glass filaments without disrupting or deleteriously affecting the desired physical characteristics of the filaments.

Still another object of the present invention is to provide an efficient and economical means for applying metal to glass filaments which readily lends itself to being adapted to conventional filament-forming means.

Another object of the present invention is to provide a metal applicator in which the temperature of the molten metal applied to the glass filaments is adjustably controllable at the point of application to the filaments.

In each of the embodiments of the present invention, the apparatus is arranged to permit a multiplicity of continuous filaments to be drawn over an applicator face to which molten metal is so supplied that the metal is disposed in a longitudinal strip-like form through which the multiplicity of filaments may be simultaneously drawn and in which the need for accuracy of alignment and space distribution of filaments is substantially eliminated. To accomplish this result, it has been found that a distributed quantity of molten metal may be suspended without under-support by allowing it to project from a slot in a vertical applicator face, thus providing an unobstructed vertical path above and below such metal for free passage of filaments to and from the metal. By making the slot sufficiently thin, the molten metal supplied thereto can project outwardly in longitudinal form and overhang the edge of the slot to envelop the filaments at the applicator face without freely flowing by reason of the surface tension therein. With a thin slot, the quantity of metal projecting therefrom can also be made independent of changes in pressure of the fluid over a range of heads within the limits of size of the container portion holding the molten metal.

A feature of the invention lies in the fact that the filaments may be readily associated with the applicators herein disclosed without need for special alignment thereof to bring about such association.

Still another feature of the invention lies in the fact that metal may be controllably fed from a common source of supply to a muliplicity of filaments simultaneously with but a limited amount of care being required to effect the desired degree of coating.

A further feature of the invention is that the care and attention to operation required to produce metal-coated filaments in mass production are reduced to the extent that a greater degree of concentration may be directed to other factors of quality control.

Other objects and features which we believe to be characteristic of our invention are set forth with particularity in the appended claims. Our invention, however, both in organization and manner of construction together with further objects and advantages thereof may be best understood by reference to the following description taken in connection with the accompanying drawings in which:

Figure 8 is a side elevational view of metal applicator for glass filaments comprising a fifth embodiment of the present invention;

Figure 9 is a partly broken away plan view of the apparatus of Figure 8;

Figure 10 is a schematic side-elevational view showing modifications over the apparatus of Figures 1 and 2 for adjustably effecting the operative association of the applicator and filaments;

Figure 11 is a side-elevational view showing modifications in the elements of the general arrangement herein set out disclosing another manner in which filaments may be pulled and collected to effect rapid production of coated filaments;

Figure 12 is a schematic side-elevational view of a metal applicator having an inclined disposition for provision of a head in an applicator of the type shown in Figures 8 and 9; and Figure 13 is a schematic perspective view in part of an applicator rod of the type shown in Figures 8 and 9 in which individual feed channels are provided to form separate globules of metal for filaments to be coated.

Figures 1, 2:
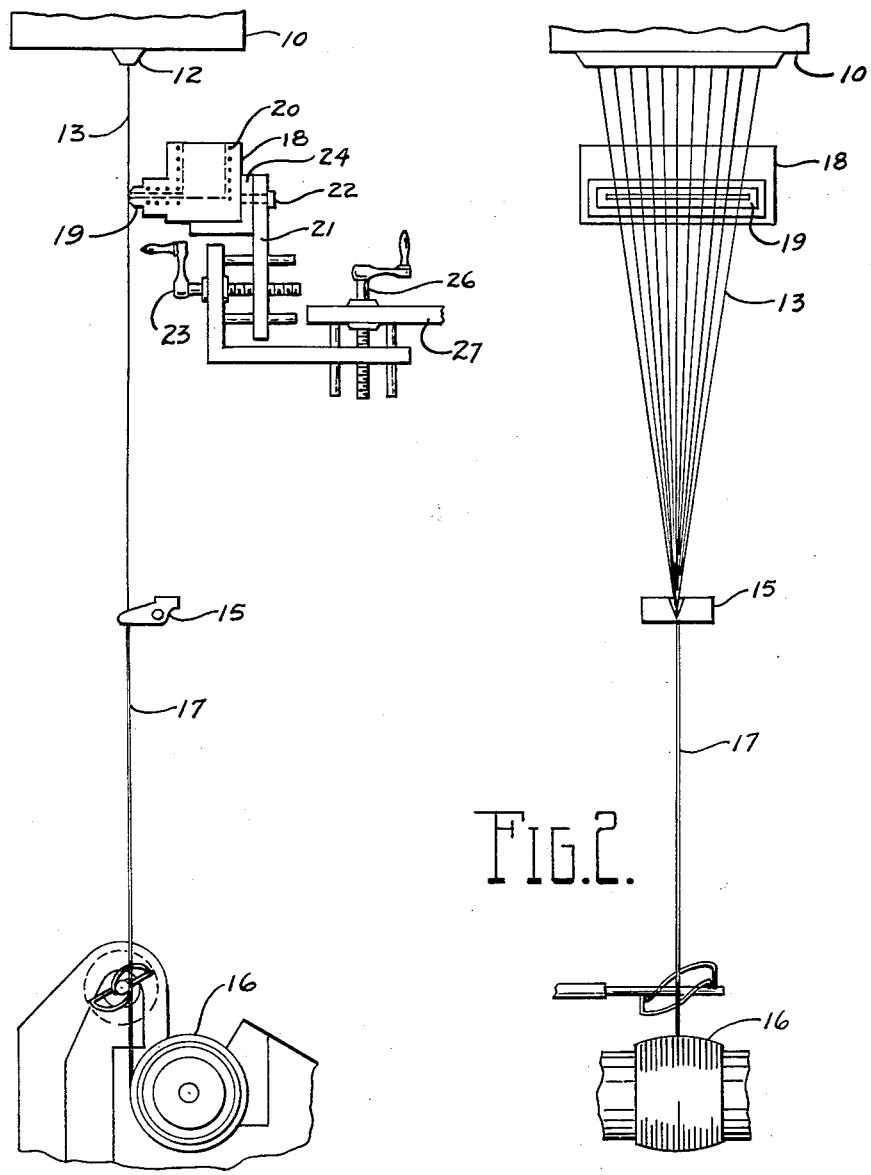
Figure 1 is a schematic side-elevational view of apparatus for forming metal-coated glass filaments in accordance with the present invention.
Figure 2 is a partially broken away front elevational view of the apparatus shown in Figure 1.

Turning to the drawings in detail Figures 1 and 2 show a general layout of fiber-forming and metal-coating apparatus including a suitable glass-melting tank having a feeder 10 provided with a series of outlets 12 in its bottom, from which flow a plurality of streams 13 of molten glass. The outlets are preferably arranged in one or two rows so that the streams are all substantially in the same plane. As the streams flow from the outlets 12 they are drawn out into fibers or filaments 13 by means of a rotating drum or collet-supported forming tube 16 which winds the filaments thereon in strand form while the winding action exerts a pulling force on the filaments to draw out the streams. A guide shoe or gathering member 15 for collection of the filaments into a group or strand 17 is provided in a position intermediate the source of the streams of molten glass and the forming tube 16.

Sizing materials may be applied to the filaments as they are gathered into the strand. By way of example, sizings such as those set out in U.S. Patent 2,234,896, issued on March 18, 1940, or a sizing material which is predominantly a lubricant such as petroleum oil, vegetable oil, molybdenum disulphide or other recognized lubricants for metal may be used.

The means for applying metal to the fibers as they are formed comprises an applicator 18 having a metal applicator portion 19 over which the filaments 13 pass as they are attenuated. The metal in the applicator is maintained in a molten condition by heating the unit by such means as an electric resistance element the conductors 20 of which are embedded within an electrical-insulation layer such as refractory cement or silicate fibers. The heater unit is provided with external terminals for connection to a suitable power source.

To facilitate positioning of the applicator 18 with the filaments 13, the entire applicator is mounted on a platform 24 pivotally supported on a horizontally moveable member 21. The platform 20 is pivoted on a pin 22 aligned with the center of the face of the applicator portion 19, thereby permitting ready levelling of the orifices with the horizontal. To permit movement of the applicator for operative association and removal from the filaments, the member 21 is made adjustably moveable in a horizontal direction by adapting an adjusting screw 23 thereto in association with a pair of slidable guide rods. The screw and guide rods are also associated with a vertically-adjustable support member 24 which can be readily moved into a position along the length of the filaments to be coated. By reason of the applicator portion 14 projecting laterally outward from the casing, the entire applicator can be readily moved into close proximity with the feeder orifices 12 with an accurate degree of adjustment by means of the vertical-adjusting screw 26 associated with a main support member 27 adapted to being mounted in a position close to that desired. With this arrangement, the applicator can be adjustably positioned even to a point immediately below the feeder where the filaments are at their highest temperature and lowest viscosity.

Figure 3:
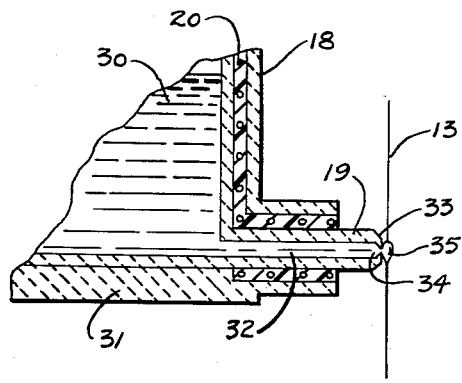
Figure 3 is a partly broken away side-elevational view in cross section of a slotted applicator comprising one embodiment of the present invention.
Figure 4:
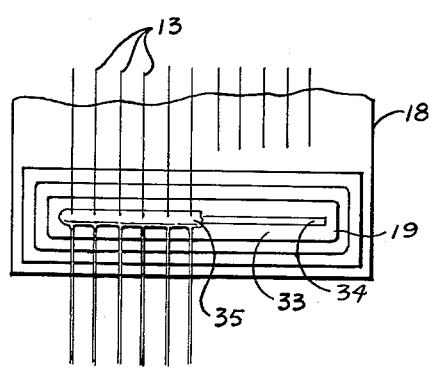
Figure 4 is a front-elevational view of the apparatus shown in Figure 3.

As shown in Figures 3 and 4, the applicator 18 is lined with graphite or similar material capable of withstanding the high temperatures of the molten metal 30. The entire lining and heater elements are encased in a refractory material 31 which promotes the retention of heat within the container portion to maintain the temperature of the molten metal 30.

A channel 32 within the unit provides a path between the main body of the molten metal 30 and the face of the metal-coating portion 19 for supply of molten metal to the coating face 33. The metal flows from a slot 34 at the face to form a longitudinal globule or strip of molten metal 35 capable of enveloping each of the filaments 13. The slot 34 is made sufficiently thin that the strip of metal 35 emitted therefrom has a surface tension developed therein which provides a sufficient retaining force to prevent free flow of the molten metal from the unit and to suspend the strip in a space in front of the face without external support. In this respect, the slot dimension is made such that the surface tension in the molten metal strip 35 permits the applicator to be made operable independently of the head of the molten metal 30 contained therein over an operating range of heads fixed by the size of the applicator. That is, one of the variables involved in filament-coating operations is eliminated to reduce the care and attention required to coat filaments on a mass production basis.

The fact that the strip 35, because of its surface tension, can be suspended without external support permits an unobstructed passage of filaments therethrough in vertical paths. In addition, because the strip 35 extends across the width of the paths taken by a group of filaments, misalignment of filaments with respect to each other in their passage across the face 33 and through the globule 35 may be disregarded in view of the continuous extension of the globule in strip form which assures that the filaments, even though slightly misaligned, will be constantly enveloped within the globule to provide a coating of metal thereon.

Figure 5:
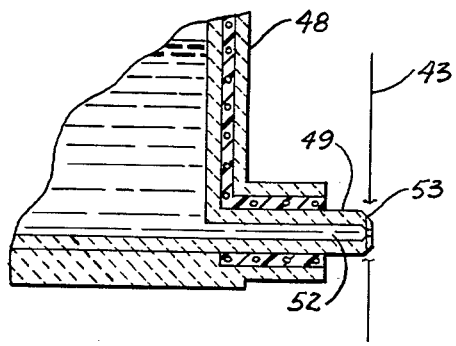
Figure 5 is a partly broken away side-elevational view in cross section of a metal applicator comprising another embodiment of the present invention.
Figure 6:
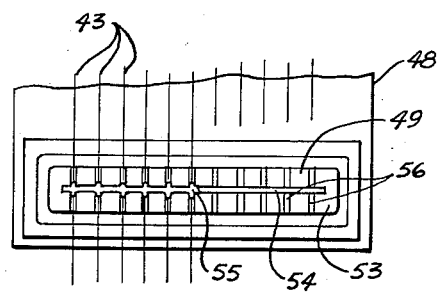
Figure 6 is a front-elevational view in part of a metal applicator of the present invention in which grooves are provided in the slotted applicator face and which comprises still another embodiment of the invention.
Figure 7:
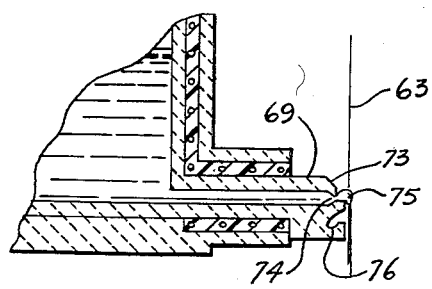
Figure 7 is a side-elevational view in cross section of part of a metal applicator incorporating modifications providing a fourth embodiment of the invention.

Figures 5 and 6 show a slotted applicator 48 modified over that shown in Figures 3 and 4 by having vertical grooves 56 disposed in the face 53 to accommodate the filaments passed over the face to permit them to pass through the base of the longitudinal globule 55 emitted from the slot 54. The slot 54 extends across the width of the face and has the grooves 56 cutting thereacross at right angles. In this arrangement the slot portions between grooves 56 offer a partial and augmenting support for the longitudinal globule 55 in such cases where the temperatures of the metal are so high as to provide a limited amount of surface tension for support of the globules. The structure made in this manner, provides unobstructed filament paths over the face 53 through the grooves 53 and additionally eliminates the need for projection of the globule beyond the extremities of the face 53 in view of the groove assuring that the filaments will pass under the surface of the metal supported within the slot itself.

Figure 6 is still another form of applicator having a face utilizing a slot 74 having a lower lip portion which projects slightly forward with a level surface for support of the globule 75. The face of the applicating portion 69 is also provided with an undercut or drip cavity 76 just under the projecting lower lip of the slot 74. A platform or support portion 77 within which the drip cavity 76 is cut or formed extends out as far as the projecting lower lip and acts as a wiping face to scoop or catch any excess of metal formed on the filaments 63 after they pass the slot and through the globule 75. Thus, the face 73 of the applicator offers a partial mechanical support for the globule as well as the wiping and drip cavity portion, both of which promote uniformity in the final coated filament. It is preferable that the wiping and drip cavity portion be incorporated in the face since the metal at these points is sufficiently fluid to permit efficient wiping of the filaments into a condition of uniformity along their length.

Figures 8 and 9 show another embodiment of the invention in which a slotted electrically heated member or rod-type applicator 80 is supplied with unmelted metal in the form of wire 81 fed by a pair of feed rolls 82 which draw the wire from a source of supply such as a spool 83. The entire assembly including the rod 80, feed rolls 82, spool 83 and a drive motor 84 therefor is mounted on platform 85 which is adjustably positionable to establish an operating relationship with the filaments 85 by means of a horizontal-adjusting screw 88 and a vertical-adjusting screw 89.

The rod 80 is provided with a horizontal slot 90 along one side or forward portion thereof and is of such length that it extends across the group of distributed glass filaments supplied by an associated feeder (not shown) to permit engagement with each of the filaments for application of a coat. The slot 90 is sufficiently thin to have a co-operative association of the molten metal therewith providing a surface tension allowing it to project outwardly from the filaments of the slot for envelopment of filaments passed thereby. The depth of the slot toward the central confines of the rod is such as to permit free flow of the molten metal under the surface of the projecting globule.

The unmelted metal rod or wire 81 is introduced into an aperture or cavity 91 centrally located at the top of the rod. A channel 92 extends between the cavity 91 and the back of the slot 90 to permit flow of metal from the cavity to the slot after the wire 81 contacts the heated sides of the cavity or the molten metal therein.

The rod 80 is electrically conducting to permit flow of current therethrough for the melting operations, but if desired, may be heated by separate elements such as a resistance type heater. It is believed more advantageous, however, to make the rod electrically conducting by constructing it with material such as graphite which will resist high temperatures and still provide the resistance characteristic which will effect an $I^2R$ heating capable of bringing the temperature up sufficiently high to melt metals introduced into contact with the walls of the cavity 91. The terminals of the rod 80 comprise a pair of studs molded into the rod and extending from opposite ends thereof for association with a pair of saddle-type lugs 93 fixedly mounted on the plate 85 and electrically insulated therefrom. The terminals 94 are secured to the lugs 93 by nuts 95 threadably mounted on the studs 94 and locked thereon. The cable leads 96 for supplying electrical current to the rod 80, may be suitably connected to the lugs as by welding them thereto. To assure proper alignment of the rod so that the slot 90 is positioned for proper engagement with the filaments 86, the bottom of the rod is flattened to provide a planar face for fixed abutting association with a rigidly mounted block 98 secured to the forward edge of the plate 85 by screws 99. The block 98 is made of electrical insulating material capable of withstanding high temperatures of the rod 80 and can be material such as a refractory cement or mica. Thus, the block 98 acts as an automatic leveling means by reason of the level face provided at the top thereof which acts as a reference level permitting formation of the rod with its lower flattened face 100 assuring proper predetermined positioning without requiring trial and error adjustment after installation.

The rolls 82 for feeding the wire 81 are driven by the motor 84 through a speed reducing unit 101. It is preferred that the motor 84 be of variable speed type to permit speed adjustment of the rolls 82 at a rate corresponding to that required for maintaining a continuous supply of molten metal to the slot for replenishment of the metal removed from the globule by the filaments passing therethrough.

This embodiment has the advantage of temperature control of molten metal at the immediate point of engagement of the metal with the filaments to be coated thereby. With current passing through the rod 80, adjustments in the magnitude thereof may be readily made to raise or lower the temperature of the molten metal supplied to the slot 90 for establishment of the most advantageous temperature relation between the filament and molten metal. Additionally, the rod is sufficiently portable that it may be readily replaced if desired by other rods of different dimensions designed for specific coating operations such as where a slot of different size proves more desirable.

Although the apparatus as shown in Figures 8 and 9 has a spool 83 disposed above the feeder rolls 82, it will be realized that the spool may be located in other positions without varying the operating characteristics thereof, or the feed rolls 82 may be located closer or a greater distance from a rod to effect a more convenient positioning of the apparatus as a whole for most efficient co-operative relationship thereof with existing filament-forming equipment.

Another modification which proves advantageous under certain conditions is to provide more than one melting cavity connected with the slot. Such an applicator is shown in Figure 13 in which the rod 130 has a series of channels 131 disposed next to each other into which unmelted metal in the form of wires 132 are fed into the top and from which metal in molten globule form is fed to the slot 133. By limiting the rate of feed of wires 132 to the rod, individual globules 134 are formed at the face of the applicator for each filament to be coated. With such an arrangement metal can be fed to the slot with greater rapidity for extra high-speed coating operations.

Figure 12 shows a slotted rod-type applicator 120 which is arranged to permit an angular disposition of the channels 121 and a longitudinal dimensioning thereof to establish a head of molten metal of desired magnitude from the unmelted wire 122 fed to the channels for application to the filaments 123. The melting heat here may be supplied by a resistance type winding 124 connected to a suitable source of electrical power.

Another feature of the various applicators herein shown and described is that the applicator faces are of such form and size that they readily lend themselves to coating operations in a controlled atmosphere such as where the coating metal is susceptible to oxidation. In such instances, both the molten metal in the container portion of the applicator as well as that exposed at the face may be surrounded by an inert gas such as nitrogen which can be fed from an outside source and supplied to the exposed metal through tubes or jets directed to the vicinity of the molten metal.

Figure 10 shows another means by which position adjustment of the applicator with respect to the filaments may be accomplished. With the apparatus here shown, adjustment of the relationship between the applicator and the filaments is accomplished by moving the filaments rather than the applicator. As illustrated in dotted lines an adjusting bar 105 is used to move the filaments to a position out of engagement with the applicator 103. The filaments 102 are drawn from a bushing or feeder 110 over a coating portion 104 of a bushing 103 and through a gathering member 106 by the forming tube 108 driven by a winder 109. Sizing material is introduced to the coated filaments in a conventional manner such as from a tube 107 directed to the gathering member 106.

When it is desired to move the filaments from their operative association with the applicator, they are merely pushed away therefrom by moving the bar 105 into contact therewith and exerting a force thereon until the filaments become disengaged from the applicator and are moved to the position shown in dotted lines.

Figure 11 illustrates an alternate manner in which filaments gathered in strand form may be drawn and collected. A pair of pulling wheels 118a and 118b of the type disclosed and described in Drummond et al. application S.N. 307,048, filed on July 24, 1952, now Patent No.

2,752,660, may be used in place of the driven forming tube shown in the foregoing figures. The wheel-type pullers have the advantage that they can pull strands at the extremely high rates of speed to which the present invention is adapted. As shown, a multiplicity of coated filaments 112 are drawn through a gathering member 116 where the sizing is applied and strand is formed. The pulling force is provided by the pulling wheels 118a and 118b which are driven by a suitable common drive through gear means or a pair of individual drives such as motors synchronized by connection with each through the pulling wheels themselves.

The strand moving at a high rate of speed is collected in a container 119 which has an opening conveniently disposed to receive the strand as it is emitted from the pulling wheels. The container 119 is made rotatable to facilitate forming the bundle 120 into a doughnut shape under the forces of rotation.

Although the apparatus in each of the illustrations herein shown and described gather and collect coated filaments in strand form, it will be readily recognized that the nature of the invention is such that the filaments may also be collected individually for applications where conditions dictate the need for single metal coated filaments.

While we have shown certain particular forms of our invention, it will be understood that we do not wish to be limited thereto since many modifications may be made within the concept of the invention and we therefore, contemplate by the appended claims to cover all such modifications which fall within the true spirit and scope of our invention.

We claim:

1. An applicator for coating filaments with metal comprising a container for holding metal in a molten condition, said container having a substantially horizontal longitudinal slot through a vertical side thereof from which molten metal in said container is supplied, said slot being disposed to permit filaments to be passed thereacross in spaced vertical paths for application of a metal coat to each, the upper and lower boundary surfaces of said slot having associated vertical grooves at right angles to said slot to accommodate the filaments passed thereacross, the vertical dimension of said slot being sufficiently small that free flow of metal from said container is prevented by the surface tension of the exposed metal, the depth of said grooves being such that the filaments can be drawn therein below the exposed surface of said metal.

2. An applicator for the metal coating of filaments passed thereby comprising, a container portion for holding metal in a molten condition, said container portion having a metal-applicating portion projecting to one side, said metal-applicating portion having a substantially horizontal slot therein with its width dimension having a generally vertical disposition, said slot being connected with said container portion, the lower slot edge of the face of said applicating portion projecting slightly beyond the upper slot edge to provide a substantially horizontal table support surface for metal emitted from said slot in overhanging relation on said lower slot edge, said face also having a cavity portion under said lower slot edge for recovery of excesses of metal on the filaments coated at said slot.

3. An applicator for coating glass filaments with metal comprising a longitudinal member of high-temperature resistant, electrically-conducting material, said member having a face portion across which filaments may be drawn to receive a coating of metal, said face portion having a depression therein in the form of a slot extending thereacross, said member having at least one channel connected to said slot through which metal in molten condition can be supplied to said slot, means for supplying and passing electrical heating current through said member directly as part of an electrical circuit for melting metal introduced to said channel in unmelted condition, and means for feeding unmelted metal to said channel.

4. An applicator for coating glass filaments with metal comprising a member of high-temperature resistant material, said member having a face portion for coating filaments drawn thereacross, said face portion having a longitudinal slot therein, said member having a channel connected to said slot for supply of molten metal thereto, grooves in said face traversing said slot each providing a filament path through molten metal disposed within the recesses of said slot, means associated with said channel for heating metal to a molten condition and means for introducing metal to said channel.

5. An applicator for applying coating material in fluid condition to glass fibers as they are attenuated comprising, a container portion for holding said fluid, an applicating face having a generally vertical orientation and a horizontal slot orifice connected to said container portion, said orifice being sufficiently small in size that the fluid emitted therefrom assumes a longitudinal globular form having surface tension forces sufficient to support the globule and prevent free flow of the fluid therefrom, means for drawing said fibers in side-by-side relation through said longitudinal globular form for a coating of the material, and means below said orifice for wiping the coated fibers comprising a cavity adapted to receive excesses of material coated on said fibers.

6. Apparatus for producing continuous coated glass filaments comprising a source of molten glass, a feeder supplying streams of molten glass from said source, means for attenuating said streams into continuous glass filaments, an applicator for coating said filaments with heat-softenable coating material comprising a source of coating material in molten form, a generally vertical coating face having a longitudinal generally horizontal slot therein connected with said source from which said coating material issues, said slot having a vertical dimension sufficiently small that the surface tension of molten coating material issuing from said slot is of magnitude sufficient to block the free flow of the coating material from said slot, the vertical dimension of said slot being sufficiently large however to permit the coating material issuing therefrom to assume a projected globular form extending the full length of the slot, said attenuating means being arranged to draw said filaments in side-by-side spaced paths across said slot and through said globular form for the individual coating of each of said filaments.

7. The method of coating glass filaments with metal comprising suspending a continuous stationary longitudinal strip of molten coating metal horizontally in horizontally projecting relation by its own surface tension from a supply source, axially moving a plurality of continuous filaments in side-by-side spaced relationship through said projecting strip at a temperature compatible to receive a coating of said suspended metal and supplying molten coating metal for said strip to maintain it in size equilibrium by replenishing the molten metal removed therefrom in coating said filament.

8. The method of producing a strand of continuous metal coated glass filaments which comprises attenuating continuous glass filaments from molten streams of glass, heating metal to be coated thereon to a molten condition below a temperature which would be damaging to the glass filaments, suspending a continuous longitudinal globule of such molten metal horizontally in horizontal projecting relationship by its own surface tension from a supply source, axially moving said continuous filaments in side-by-side spaced relationship while still hot due to their residual heat of formation through said suspended longitudinal globule to apply an individual coat of metal to each, and then gathering said coated filaments into a strand.

9. The method of producing metal coated glass filaments which comprises flowing streams of glass from a source of molten glass, attenuating continuous glass filaments from said streams of glass, utilizing the means for attenuation of said filaments to axially move said glass filaments in side-by-side relationship to a collection zone, heating metal to be coated on said filaments to a molten condition below a temperature which would be damaging to the glass filaments, forming a continuous longitudinal globule of such molten metal in projecting relationship from a longitudinal slot orifice connected to a supply of said metal, orienting said longitudinal globule in extended relationship across the paths of said filaments and in projected relationship into said paths, said longitudinal globule of metal being formed to such size that the metal is blocked from freely flowing by its own surface tension at the orifice, and replenishing the molten metal removed from said globule of metal to maintain said globule in size equilibrium for a continuous coating of said filaments.

10. The method of simultaneously and continuously producing a plurality of metal coated glass filaments which comprises flowing streams of glass from a source of molten glass, attenuating continuous glass filaments from said streams of glass, heating metal to be coated thereon to a molten condition below a temperature which would be damaging to the glass filaments, forming a continuous longitudinal globule of such molten metal which is aligned horizontally in its end to end direction and projecting horizontally in suspended relation from a longitudinal slot orifice connected to a supply of said metal, said longitudinal globule of metal being formed to such size that the metal is suspended in its horizontal projecting relation and blocked from freely flowing by its own surface tension at the orifice, utilizing the means effecting attenuation of said filaments to axially move said filaments in side-by-side vertical paths through said globule of molten metal for a coating of said metal, and replenishing the molten metal removed from said longitudinal globule across its full length as metal is removed therefrom to maintain said globule in size equilibrium for a continuous coating of said filaments.

11. The method of coating continuous glass filaments with metal comprising forming a ridge of molten metal suspended and blocked from freely flowing by the surface tension of the metal at an orifice connected to a supply of said metal, guiding continuous glass filaments in vertical paths past said orifice, feeding a sufficient amount of said metal from said supply of said metal through said orifice to maintain said ridge of molten metal sufficiently large while suspended by its own surface tension about said filaments to apply a metal coating thereto.

12. The method of producing a strand of metal-coated glass fibers which comprises flowing streams of glass from a source of molten glass, attenuating continuous glass fibers from said streams, forming a ridge of molten metal at an orifice connected to a supply of said metal, said ridge of metal being formed to such size that the metal is suspended and blocked from freely flowing by its own surface tension at the orifice, guiding said glass fibers in generally vertical paths through said ridge of molten metal for a coating of said metal, gathering said fibers into a strand after being coated, and replenishing the molten metal removed from said ridge of metal to maintain said ridge of metal in size equilibrium for continuous coating of said fibers.

References Cited in the file of this patent

UNITED STATES PATENTS

| | | |
|---|---|---|
| 1,318,871 | Heine | Oct. 14, 1919 |
| 1,496,309 | Girvin | June 3, 1924 |
| 1,934,796 | Friedrich | Nov. 14, 1933 |
| 2,007,441 | Candy | July 9, 1935 |
| 2,162,980 | Smith | June 20, 1939 |
| 2,234,986 | Slayter et al. | Mar. 18, 1941 |
| 2,315,411 | Flood | Mar. 30, 1943 |
| 2,373,078 | Kleist | Apr. 3, 1945 |
| 2,413,413 | McDermott et al. | Dec. 31, 1946 |
| 2,598,908 | Grimson | June 3, 1952 |
| 2,699,415 | Nachtman | Jan. 11, 1955 |